March 20, 1934.    S. T. WILLIAMS ET AL    1,951,460
VALVE STEM
Filed April 22, 1930
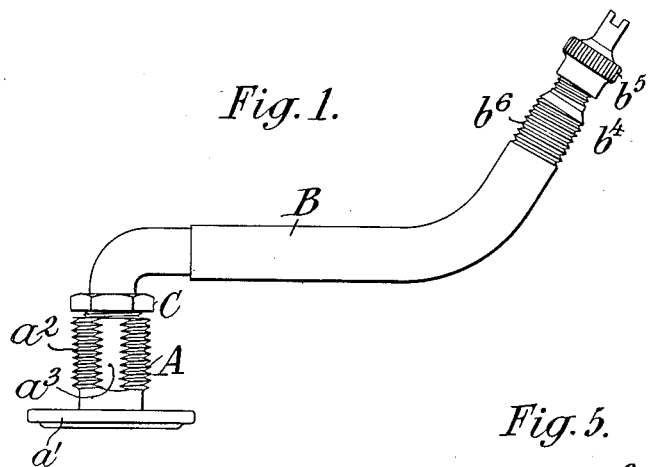
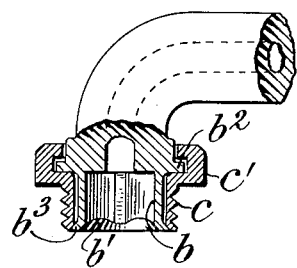
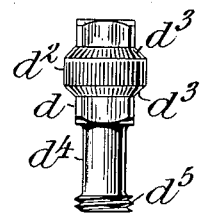
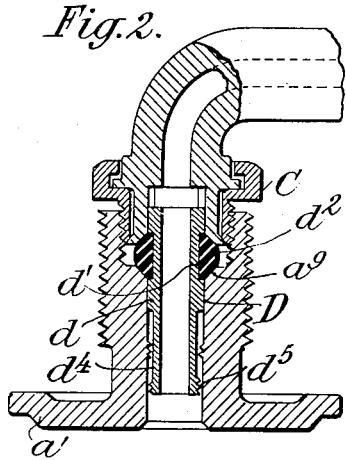
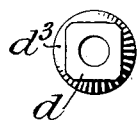
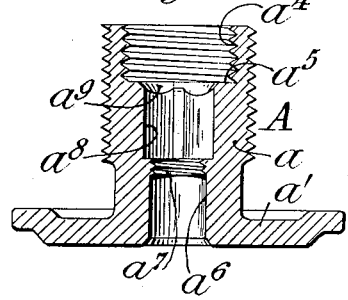
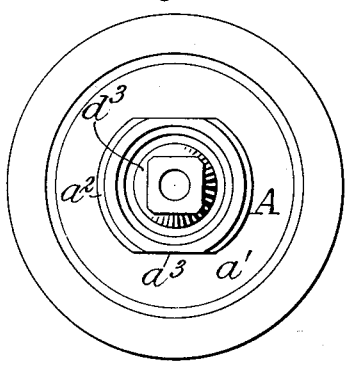
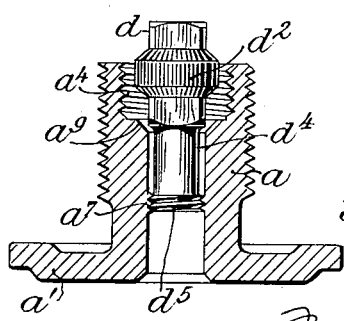
INVENTORS
Selden T. Williams
and John Wahl,
By Attorneys,
Fraser, Myers & Manley.

Patented Mar. 20, 1934

1,951,460

UNITED STATES PATENT OFFICE 1,951,460

VALVE STEM

Selden T. Williams, Forest Hills, and John Wahl, Rosedale, N. Y., assignors to A. Schrader's Son, Inc., Brooklyn, N. Y., a corporation of New York Application April 22, 1930, Serial No. 446,217

8 Claims. (Cl. 285—167)

The present invention relates to valve stems for tire valves or the like, and more particularly to the manner of providing a leak-tight joint between the coupled parts of a divided or two-piece valve stem.

Heretofore pneumatic tubes for tires have been provided with one-piece valve stems, either straight or bent, the length or character of the bend being dependent upon the wheel upon which the tire was to be mounted. This necessitated the carrying in stock at service stations of a large number of pneumatic tubes so as to include the various forms of stems.

It has been proposed to equip the inner tubes with a short valve stem part of standard dimensions and to supply to the service stations or dealers valve stem extension elements fitted with valve insides, said extension elements being either straight or bent and of various lengths and angles, which, when assembled with the valve stem base part already in the tube, any desired form of valve stem can be obtained. Although this proposal has not gone into extensive use, various forms of coupling means for providing a leak-tight joint between the two valve stem parts have been proposed, but for one reason or another have been found deficient and objectionable.

According to the present invention we provide a novel manner of coupling together valve stem parts to insure a leak-tight joint therebetween under all operating conditions of the wheel upon which the tire and stem are mounted. The coupling joint is of a character which permits of its quick assembly; one which insures alignment of the valve stem parts; one in which the sealing element, should it become defective, can be readily replaced at a nominal cost; one in which the sealing element is removably carried by one of the valve stem parts and held thereby against accidental loss or separation; and one in which the coupling of the valve stem parts together is not hindered or affected by variations in the rubber patch thickness to which the valve stem base part is attached. The invention also embodies other features of novelty which will be apparent from the detailed description which follows, reference being had to the accompanying drawing wherein Figure 1 is a side elevation of a two-piece valve stem, the upper stem part having a double angular bend.

Fig. 2 is a longitudinal section on an enlarged scale of the coupling joint of the valve stem shown in Fig. 1.

Fig. 3 is a longitudinal section of the coupling end of the upper valve stem part, a portion of said stem being shown in elevation.

Fig. 4 is a longitudinal section of the valve stem base part.

Figs. 5 and 6 show two side elevational views of the sealing plug.

Fig. 7 is a top plan view of the sealing plug shown in Figs. 5 and 6.

Fig. 8 is a side elevation of the sealing plug and longitudinal section of the stem base element showing the manner in which said parts are detachably connected together and held against accidental separation.

Fig. 9 is a top plan view of Fig. 8.

Referring to the drawing the invention is shown as applied to a so-called two-piece valve comprising a stem base part A and an upper stem part B, said parts being coupled together through the medium of an externally threaded sleeve nut C and a sealing plug D.

The stem base part A comprises a tubular stud $a$ having a bore therethrough of different diameters and formed at its lower end with a lateral extension flange $a'$ adapted to engage against the inner surface of a pneumatic tube or the like for connecting the part A thereto. On its exterior the stud $a$ is provided with mutilated threads $a^2$ and opposite flat sides $a^3$, as is conventional with valve stems. The bore of the stud A at its top is of enlarged diameter and is internally screw-threaded, as indicated at $a^4$, and terminates at its lower edge in a shoulder $a^5$ which connects with a bore of smaller diameter $a^6$. Intermediate the ends of said bore $a^6$ it is provided with an internally threaded annular rib $a^7$. Between the top of said rib and the shoulder $a^5$ the bore $a^6$ is of polygonal form, as shown at $a^8$, herein shown as square with chamfered corners, the same being formed with a broaching tool in a well known manner. The top of said broached bore or recess is concaved to provide a seating face $a^9$.

The coupling end of the upper stem part B is provided with enlarged internal recess $b$ which is of the same polygonal form as the recess $a^8$, and is formed in a like manner with a broaching tool. At is open end said recess $b$ is provided with a concave seat $b'$ of complemental form to the recess $a^9$. In proximity to its coupling end the valve stem part B is formed with an annular flange $b^2$ over which is mounted to swivel thereon an externally threaded bushing nut $c$, the upper part thereof being provided with wrench-engaging faces $c'$, the threads being of a size to engage within the threaded bore portion $a^4$ of the stem base part A. The lower end of said nut $c$ overlies an outwardly extending lip $b^3$. The stem part B at its outer end is provided with a reduced externally threaded nipple $b^4$ upon which engages a conventional valve cap $b^5$, the stem below the nipple also being threaded, as shown at $b^6$.

For cooperative engagement with the stem parts A and B whereby said parts will be brought into true alignment when coupled together and have a leak-tight seal provided therebetween, we have provided a novel sealing plug element D. This plug consists of a body portion $d$ of square contour with chamfered corners, adapted to snugly engage within the broached recess $a^8$ and $b$. Intermediate the ends of this squared body portion it is formed with an external annular groove $d'$ in which seats a compressible packing $d^2$, the diameter of which is greater than the diagonal dimension of the body portion, said packing $d^2$ having oppositely tapered or beveled seating faces $d^3$. The plug D below the squared body portion is formed with a reduced cylindrical portion $d^4$ which, at its free end, is slightly enlarged and externally screw-threaded, as shown at $d^5$. The length of said reduced portion $d^4$ is slightly greater than the depth of the broached recess $a^8$ in order that the screw-threaded portion $d^5$ may be threaded through the internally screw-threaded rib $a^7$ in the stem base part A, after which the squared body portion above the reduced cylindrical portion $d^4$ can non-rotatably seat within the broached recess $a^8$ and the surface $d^3$ of the packing $d^2$ engage upon the seat $a^9$. It will thus be seen that the plug D when mounted within the part A is normally held against relative rotation and is adapted for limited relative longitudinal movement therewith.

To couple the valve stem parts A and B together, the broached recess $b$ in the part B is fitted over the upper squared part of the plug D. The parts A and B are thus held against relative rotation with respect to each other and with respect to the plug D. The swivel nut $c$ is then threaded into the bore $a^4$, which action presses the seats $a^9$ and $b'$ tightly against the packing surfaces $d^3$ to insure a leak-tight joint between the parts.

According to the present invention as embodied in the constructions hereinbefore described, the following advantages over formerly proposed two-piece valves are realized: (1) The sealing plug is free to come into alignment with the seats on both the valve stem parts and effect a positive leak-tight seal between the parts; (2) by having the coupling nut $c$ engage the interior of the stem base part, all variations in the thickness of the rubber patches through which the valve stems pass may be disregarded since there is no danger of the coupling means being interfered with by the bridge washer and its clamping nut; (3) the sealing plug is replaceable should it become defective due to any cause, and its removability from the stem base part permits its installation after the completion of the vulcanizing and testing operations on the tube; (4) the plug body can be economically made from square section stock which can be exteriorly grooved for application of the rubber seal. The construction is such as lends itself to ready handling and efficient production; (5) the cooperative engagement between the broached recess and the squared portions of the plug serves as a locking means after assembly of the valve parts and removes from the coupling nut any turning or loosening effects due to vibration.

While we have shown and described a preferred embodiment of our invention and the manner in which the same may be carried out in practice, we do not wish to be limited to the details of construction disclosed, since modifications thereof may be resorted to without departing from the spirit of the invention.

What we claim is:

1. A device of the class described comprising two tubular members having seats, a tubular element having seats adapted for leak-tight engagement with the seats on the members, means for normally preventing relative rotation between the element and the members, and means for coupling together the members with their seats in engagement with the seats on the element, said element being removably carried by one of the members and held against accidental separation therefrom.

2. A valve stem or the like comprising a part adapted for connection with a fluid receptacle, a part adapted to receive a valve, each of said parts having a seat and a bore leading rearwardly from said seat, a separable tubular plug having a pair of spaced seats adapted to engage the seats on the valve stem parts and form leak-tight seals therewith and portions adapted to engage in the bores of the valve stem parts, said plug being carried by one of the valve stem parts and adapted for limited longitudinal movement but normally held against relative rotation therewith, and means for coupling together the valve stem parts to press their seats into engagement with the seats on the plug.

3. A valve stem or the like comprising a part adapted for connection with a fluid receptacle, a part adapted to receive a valve, each of said parts having a seat and a polygonal bore leading rearwardly from said seat, a separable tubular plug having a pair of spaced seats adapted to engage the seats on the valve stem parts and form leak-tight seals therewith and polygonal portions on either side of the seats adapted to non-rotatably engage in the bores of the valve stem parts, said tubular plug being removably carried by one of the valve stem parts and held against accidental separation therefrom and means for coupling together the valve stem parts to press their seats into engagement with the seats on the plug.

4. A valve stem part or the like having a bore therethrough, a seat, and a part extending into said bore having a seat engageable with the seat on the stem, said part being loosely carried by said stem and held against accidental removal therefrom.

5. A valve stem part or the like having a bore therethrough, a seat communicating with said bore, and a tubular member extending into said bore having a seat engageable with the seat on the stem, said tubular member being adapted for limited longitudinal movement relative to said stem and loosely carried thereby against accidental removal therefrom.

6. A valve stem or the like comprising a part adapted for connection to a fluid receptacle and a hollow plug, said part having an internal seat, a bore leading inwardly from said seat, and an annular rib within said bore, and said plug having a seat engageable with the seat on the stem, a portion extending into the bore and through said rib, and normally held against accidental removal from the bore.

7. A valve stem or the like comprising a part adapted for connection to a fluid receptacle and a hollow plug, said part having an internal seat, a bore leading inwardly from said seat, and an annular internally threaded rib within said bore, and said plug having a seat engageable with the seat on the stem, a portion extending into the bore, and a screw-threaded portion adapted to engage the threads in the rib and pass therethrough to hold said plug against accidental removal from the bore.

8. A valve stem or the like comprising a part adapted for connection to a fluid receptacle, said part having an internal seat, a bore leading inwardly from said seat, and an annular internally threaded rib within said bore, a hollow plug having a seat engageable with the seat on the stem part, a portion adapted to extend into the bore and through the rib therein, and a portion to screw-threadedly pass through said rib, the bore in the stem part and the plug having cooperating surfaces which permit relative longitudinal but prevent relative rotational movement therebetween when the screw threaded part on the plug is extended through the rib.

SELDEN T. WILLIAMS.
JOHN WAHL.